United States Patent
Otsubo (10) Patent No.: US 8,727,174 B2
(45) Date of Patent: May 20, 2014

(54) TANK AND MANUFACTURING METHOD THEREOF

(75) Inventor: Hirokazu Otsubo, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 182 days.

(21) Appl. No.: 13/263,691

(22) PCT Filed: Apr. 10, 2009

(86) PCT No.: PCT/JP2009/057351
§ 371 (c)(1),
(2), (4) Date: Oct. 7, 2011

(87) PCT Pub. No.: WO2010/116526
PCT Pub. Date: Oct. 14, 2010

(65) Prior Publication Data
US 2012/0024746 A1   Feb. 2, 2012

(51) Int. Cl.
*F17C 1/06* (2006.01)
*B29C 63/10* (2006.01)

(52) U.S. Cl.
CPC . *F17C 1/06* (2013.01); *B29C 63/10* (2013.01); *F17C 2203/011* (2013.01); *F17C 2203/067* (2013.01)
USPC ............................ 220/589; 220/588; 156/188

(58) Field of Classification Search
CPC ............... F17C 1/16; F17C 1/06; F17C 1/04; F17C 1/02; F17C 1/005; F17C 2203/011; F17C 2203/01; F17C 2203/067; F17C 2203/0668; F17C 2203/0663; F17C 2203/066; B29C 63/10; B29C 63/08
USPC .......... 220/589, 588, 586, 581; 156/188, 185, 156/184; 493/95, 93, 84; 428/36.3

IPC ............... F17C 1/06; B29C 63/10,63/08, 70/08
See application file for complete search history.

(56) References Cited

U.S. PATENT DOCUMENTS

| | | | | |
|---|---|---|---|---|
| 2,744,043 A | * | 5/1956 | Ramberg | 156/155 |
| 2,791,241 A | * | 5/1957 | Reed | 138/144 |
| 3,240,644 A | * | 3/1966 | Wolff | 156/165 |
| 3,815,773 A | * | 6/1974 | Duvall et al. | 220/590 |

(Continued)

FOREIGN PATENT DOCUMENTS

| | | | | |
|---|---|---|---|---|
| DE | 10345159 A1 | * | 2/2005 | F17C 1/04 |
| JP | 11-101397 A | | 4/1999 | |

(Continued)

OTHER PUBLICATIONS

Translation of JP 2005-036918 [Sakaguchi et al.], Figs. 1 and 4, Paragraph 39.*

(Continued)

*Primary Examiner* — Robert J Hicks
(74) *Attorney, Agent, or Firm* — Kenyon & Kenyon LLP (57) ABSTRACT

A tank which optimizes a laminating configuration of hoop layers and helical layers to enhance an efficiency of strength development by wound fibers, and a manufacturing method of the tank. The tank includes a liner, and an FRP layer constituted of an axial fiber layer formed by winding fibers around the outer periphery of the liner at a winding angle in a range exceeding 0° and less than 30° with respect to a tank axis in the center of the tank and a peripheral fiber layer formed by winding the fibers around the outer periphery of the liner at a winding angle in a range of 30° or more and less than 90° with respect to the tank axis, and folded fiber ends of the peripheral fiber layer in a tank axial direction draw a track.

10 Claims, 8 Drawing Sheets

(56) References Cited

U.S. PATENT DOCUMENTS

| | | | | |
|---|---|---|---|---|
| 4,225,051 | A | * | 9/1980 | Faudou et al. ............... 220/590 |
| 4,366,917 | A | * | 1/1983 | Kotcharian ............. 220/560.06 |
| 5,798,156 | A | * | 8/1998 | Mitlitsky et al. ............ 428/35.9 |
| 7,541,078 | B1 | * | 6/2009 | Arritt et al. ................ 428/36.91 |
| 2007/0205201 | A1 | * | 9/2007 | Cundiff et al. ................ 220/591 |
| 2008/0061466 | A1 | * | 3/2008 | Cornwell et al. ............. 264/148 |

FOREIGN PATENT DOCUMENTS

| | | |
|---|---|---|
| JP | 2002-106787 A | 4/2002 |
| JP | 2005-036918 A | 2/2005 |
| JP | 2005-113971 A | 4/2005 |
| JP | 2008-032088 A | 2/2008 |
| JP | 2008-057632 A | 3/2008 |

OTHER PUBLICATIONS

Translation of JP 2002-106787 [Ishita et al.], Figs. 1 and 4, Paragraphs 4 and 41.*

International Search Report issued Jul. 28, 2009 of PCT/JP2009/057351.

* cited by examiner

TANK AND MANUFACTURING METHOD THEREOF

This is a 371 national phase application of PCT/JP2009/057351 filed 10 Apr. 2009, the contents of which are incorporated herein by reference.

TECHNICAL FIELD

The present invention relates to a tank and a manufacturing method thereof, and more particularly, it relates to the improvement of a structure in a tank filled with a hydrogen gas or the like with a high pressure.

BACKGROUND ART

As a tank which is utilized for the storage of a hydrogen gas or the like, there is utilized a tank including a Fiber Reinforced Plastic (FRP) layer formed by alternately laminating hoop layers and helical layers on the outer periphery of a liner, thereby achieving weight saving (see e.g. Patent Document 1). The liner has a function of a member which prevents the permeation of the hydrogen gas or the like to store the gas or the like in an airtight manner, and the Fiber Reinforced Plastic (FRP) layer has a function of a member which imparts such a strength as to bear a high internal pressure.

Figure 1:
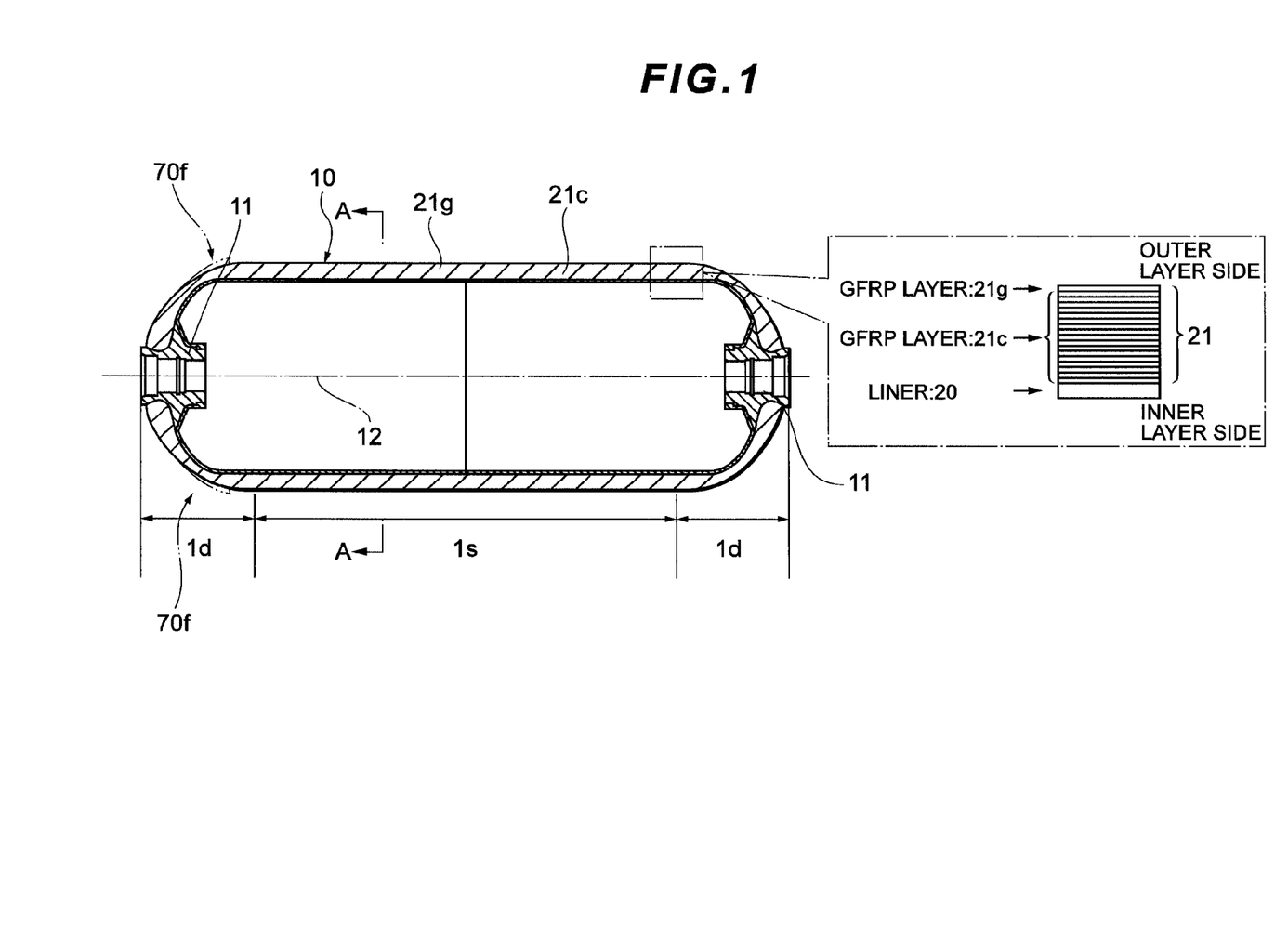
FIG. 1 shows a sectional view and a partially enlarged view showing a structure of a tank in an embodiment of the present invention.
Figure 2:
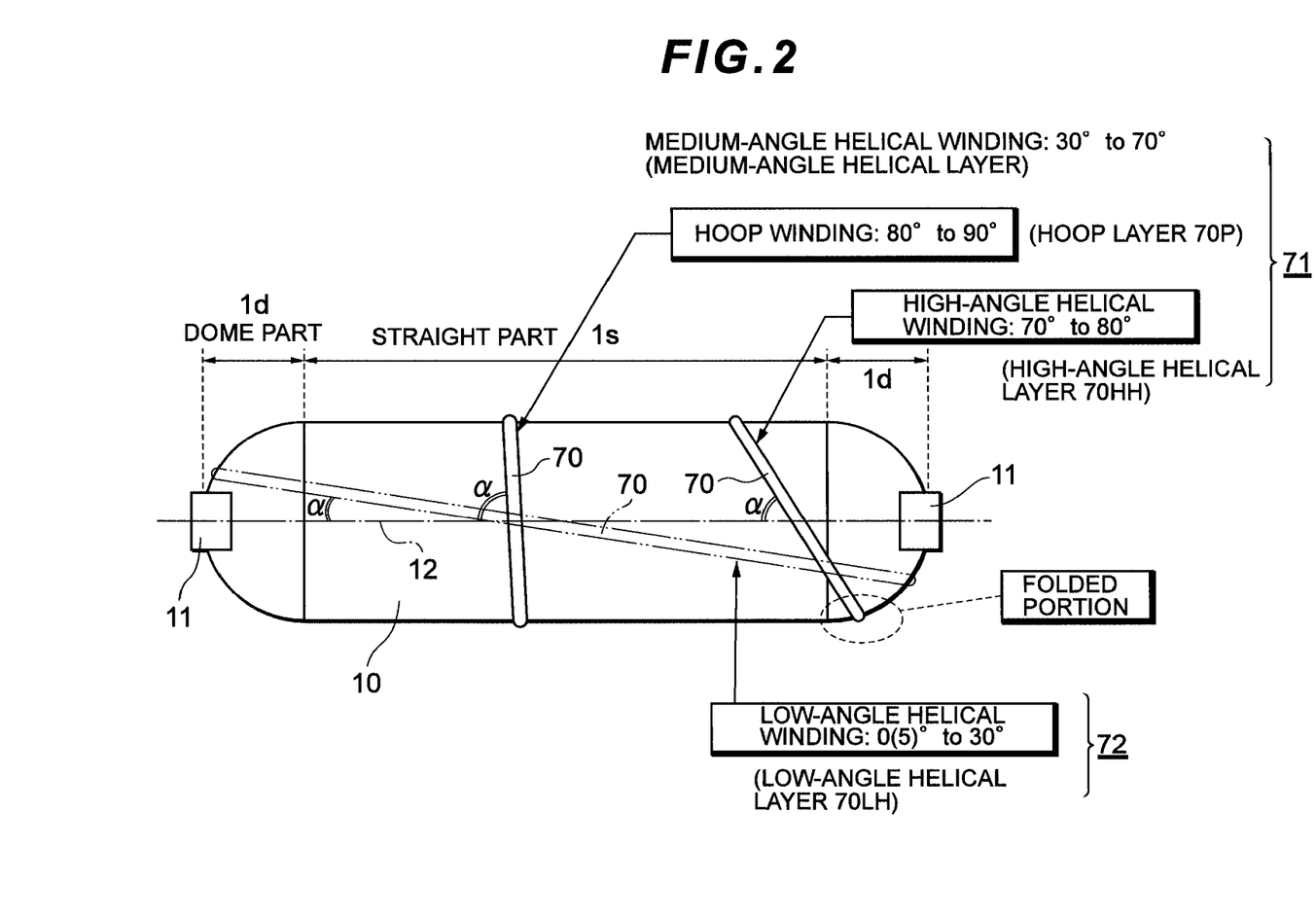
FIG. 2 is an explanatory view of various ways of winding fibers.

The hoop layer which forms the Fiber Reinforced Plastic (FRP) layer is a layer formed by hoop-winding fibers (e.g. carbon fibers) (a winding way of winding the fibers around a tank trunk part almost vertically to a tank axis), and the helical layer is a layer formed by helically winding the fibers (a winding way of winding the fibers up to a tank dome part almost in parallel with the tank axis) (see FIG. 2). Moreover, as to the helical winding, when a winding angle with respect to the tank axis is changed, it is possible to obtain winding ways having different configurations, for example, high-angle helical winding and low-angle helical winding. When the Fiber Reinforced Plastic (FRP) layer is formed in this manner, how to wind the fibers is an important element for enhancing the efficiency of strength development by the Fiber Reinforced Plastic (FRP).

Heretofore, as a specific fiber winding way, it has been suggested that, for example, a peripheral fiber layer (a hoop layer and a high-angle helical layer) and an axial fiber layer (a low-angle helical layer) are alternately wound or successively wound so as to obtain a layer number ratio of 1:1.

PRIOR ART DOCUMENT

Patent Documents

[Patent Document 1] JP 2008-032088 A

SUMMARY OF THE INVENTION

Problems to be Solved by the Invention

However, the above conventional tank has problems (1) high-angle helical layers are used a lot, rigidity of fibers in a peripheral direction lowers, and strength development efficiency by wound fibers deteriorates; (2) in a Fiber Reinforced Plastic (FRP) layer, directional fibers (peripheral fibers and axial fibers) are successively wound, a peripheral fiber layer and an axial fiber layer are almost uniformly formed, and also with this state, the strength development efficiency deteriorates; (3) in axial fiber layers laminated on and under the high-angle helical layer, bends (undulations) of the fibers due to the transfer of unevenness of the high-angle helical layer are generated to cause meanderings, which also becomes a factor of the deterioration of the strength development efficiency; and (4) folded positions during the winding of the fibers extend up to a dome part of the tank, and an amount of the fibers to be used accordingly increases to cause mass increase of the tank sometimes.

Therefore, in order to solve at least one of the above problems, an object of the present invention is to provide a tank which optimizes a laminating configuration of hoop layers and helical layers to enhance an efficiency of strength development by wound fibers, and a manufacturing method of the tank.

Means for Solving the Problems

To solve such problems, the present inventors have performed various investigations. The above problems do not become especially large problems, when a tank has a low pressure and a small diameter, because a stress in a tank wall can be treated as a uniform distribution on the basis of a way of thinking about a thin cylinder (the cylinder having a thickness which is small as compared with a diameter thereof). However, in recent years, to meet a demand for enlargement and high pressure (e.g. about 70 MPa) of the tank or a demand for decrease of the number of the tanks for the purpose of increase of the degree of freedom in vehicle layout, the thickness of the Fiber Reinforced Plastic (FRP) layer tends to increase. If the thickness of the Fiber Reinforced Plastic (FRP) layer increases, a stress gradient which is exerted in the layer cannot be ignored in actual situations. Above all, Fiber Reinforced Plastic (FRP) is an anisotropic material, and in the tank, a peripheral fiber layer and an axial fiber layer are superimposed to constitute the layer, whereby the layer is easily and remarkably influenced by the stress gradient.

Here, the present inventors have investigated the efficiency of fiber strength development in a peripheral fiber layer (a hoop layer) during the winding of the fibers, and have confirmed that when a high-angle helical layer is formed, a rigidity of the fibers themselves lowers, to deteriorate the efficiency of the strength development as follows. That is, as compared with a case where the rigidity of hoop winding at a winding angle of 89° with respect to a tank axis is 1, for example, the rigidity decreases to about 0.9 at a winding angle of 80°, about 0.7 at a winding angle of 70°, and to about 0.4 at a winding angle of 60°, and from the viewpoint of the strength development, the winding becomes inefficient as much as the decrease. Examples of a reason for the decrease include (A) the fibers constituting the Fiber Reinforced Plastic (FRP) layer are strong against a tensile force, but is weak under an external force in a traverse direction which is vertical to a tensile direction, the hoop winding easily develops the strength, but the helical winding does not easily develop the strength, and it becomes difficult to effectively exert a force; and (B) when the thickness of the Fiber Reinforced Plastic (FRP) layer increases and the stress gradient occurs, the fibers wound on an outer side cannot exert any potential of the strength development, and a degree of contribution to the strength lowers.

The present inventors have further performed the investigations in view of these situations, and have obtained a new finding which results in the solution of such problems. On the basis of such finding, the present invention provides a tank comprising a liner, and a Fiber Reinforced Plastic (FRP) layer including an axial fiber layer formed by winding fibers around the outer periphery of the liner at a winding angle in a range exceeding 0° and less than 30° with respect to a tank axis in the center of the tank, and a peripheral fiber layer formed by winding the fibers around the outer periphery of the liner at a winding angle in a range of 30° or more and less than 90° with respect to the tank axis. Folded fiber ends of the peripheral fiber layer in a tank axial direction draw a track which narrows from the inside toward the outside in a laminating direction of the fiber layers. More preferably, the folded fiber ends formed outwardly in the laminating direction of the fiber layers are positioned closer to the center of the tank than the folded fiber ends of the peripheral fiber layer in the tank axial direction formed inwardly in the laminating direction.

When the fibers are wound around the outer periphery of the liner to form the Fiber Reinforced Plastic (FRP) layer, the fibers are usually wound while moving a fiber winding position with respect to the rotating liner so that the fibers reciprocate along the tank axial direction. In this case, according to the present invention, among the folded fiber ends formed when the fibers are folded back at the fiber winding position, the inward ends (inside the tank) are disposed closer to the center in the tank axial direction than the outward ends (outside the tank). In such a tank, when the peripheral fiber layers are laminated, a fold width narrows, and the folded fiber ends come closer to the center of the tank. In a conventional configuration, a high-angle helical layer has a certain degree of thickness, and bends (undulations) are generated sometimes in a low-angle helical layer formed continuously from the high-angle helical layer to both end sides in the tank axial direction (a tank dome part) (see FIG. 12), but according to the present invention in which the folded fiber ends are tilted as described above, the bends (the undulations) of the low-angle helical layer can be suppressed.

Additionally, in such a tank, another helical layer can efficiency be laminated on a tilt portion. Therefore, the development efficiency of a fiber strength can further be enhanced.

In this tank, an occupying ratio of the peripheral fiber layer preferably becomes larger in an inward portion than in an outward portion in the laminating direction of the fiber layers. In particular, when the thickness of the Fiber Reinforced Plastic (FRP) layer increases, a stress gradient is generated as described above, and the strength development due to the outside fibers tend to become non-effective. These peripheral fiber layers are not uniformly laminated in the Fiber Reinforced Plastic (FRP) layer, but more peripheral fiber layers are thus arranged (to form an inner layer) in the inward portion in the tank, whereby a development ratio of the fiber strength by these peripheral fiber layers can be maintained in a high state. Moreover, this decreases the amount of the fibers to be used, and cost saving can be achieved. Furthermore, when the numbers of the fiber layers are the same, the strength development ratio of the outermost layer can be increased, whereby the strength development ratio by the outward fibers can relatively be increased.

In the above tank, the peripheral fiber layer is preferably formed by a hoop layer having a winding angle of 80° or more and less than 90° with respect to the tank axis, and the axial fiber layer is formed by a low-angle helical layer having a winding angle of 0° or more and less than 30° with respect to the tank axis.

In this case, a high-angle helical layer having a winding angle of 30° or more and less than 80° with respect to the tank axis is further preferably used in the outermost layer of the Fiber Reinforced Plastic (FRP) layer. Usually in the high-angle helical layer, the folded ends of the fibers are positioned in a boundary part between a straight part and the dome part of the tank, and hence the corresponding portions easily thicken. When such a high-angle helical layer is used in the center of the Fiber Reinforced Plastic (FRP) layer, fiber bends (undulations) or meanderings occur sometimes in the low-angle helical layer owing to the influences of the thickened folded ends as in a conventional tank (see FIG. 12). On the other hand, according to the present invention in which the high-angle helical layer is used in the outermost layer of the Fiber Reinforced Plastic (FRP) layer as described above, it is possible to suppress the fiber bends and the like in such a low-angle helical layer.

In such a tank, the Fiber Reinforced Plastic (FRP) layer is preferably constituted of the hoop layers and the helical layers at a ratio of the number of the hoop layers:the number of the helical layers which is 2 or more. The ratio of the number of the hoop layers:the number of the helical layers which is 2 or more preferably guarantees a strength required for the dome part and the straight part of the tank.

Moreover, the folded fiber ends of part of the peripheral fiber layer are preferably positioned closer to the center of the tank in the tank axial direction than the folded fiber ends of another peripheral fiber layer positioned outwardly from the peripheral fiber layer in the laminating direction. When formability, smoothness and the like of the hoop layer or the high-angle helical layer constituting each layer of the peripheral fiber layer are taken into consideration, as to the positions of the folded ends of these peripheral fiber layers, the folded ends thereof do not have to be arranged so that the track of the ends narrows toward the outer periphery of the tank. For example, the positions of the folded ends may shift forwards or backwards in the tank axial direction.

In the above tank, the winding around the liner can start with the fibers which form the helical layer at a winding angle of 0° or more and less than 80° with respect to the tank axis. Alternatively, the winding around the liner can start with the fibers which form the hoop layer at a winding angle of 80° or more and less than 90° with respect to the tank axis. In this manner, when the fibers with which the winding starts are appropriately changed, a portion can be set as a breakdown start position, if the tank breaks down.

Moreover, a manufacturing method according to the present invention is a manufacturing method of a tank comprising the steps of winding fibers around the outer periphery of a liner at a winding angle in a range exceeding 0° and less than 30° with respect to a tank axis in the center of the tank to form an axial fiber layer; and winding the fibers at a winding angle in a range of 30° or more and less than 90° with respect to the tank axis to form a peripheral fiber layer, thereby forming a Fiber Reinforced Plastic (FRP) layer, wherein the peripheral fiber layer is formed so that folded fiber ends of the peripheral fiber layer in a tank axial direction draw a track which narrows from the inside toward the outside in a laminating direction of the fiber layers.

Effect of the Invention

According to the present invention, it is possible to realize a tank having a structure in which both a burst strength and a fatigue strength are achieved.

DETAILED DESCRIPTION OF THE INVENTION

Hereinafter, a constitution of the present invention will be described in detail with respect to an example of a mode for carrying out the invention shown in drawings.

FIG. 1 to FIG. 11 show an embodiment of a tank according to the present invention and a manufacturing method of the tank. Hereinafter, there will be described illustration of a case where a tank (a high-pressure tank) 1 according to the present invention is applied to a high-pressure hydrogen tank as a hydrogen fuel supply source. The hydrogen tank can be utilized in a fuel cell system or the like.

Figure 3:
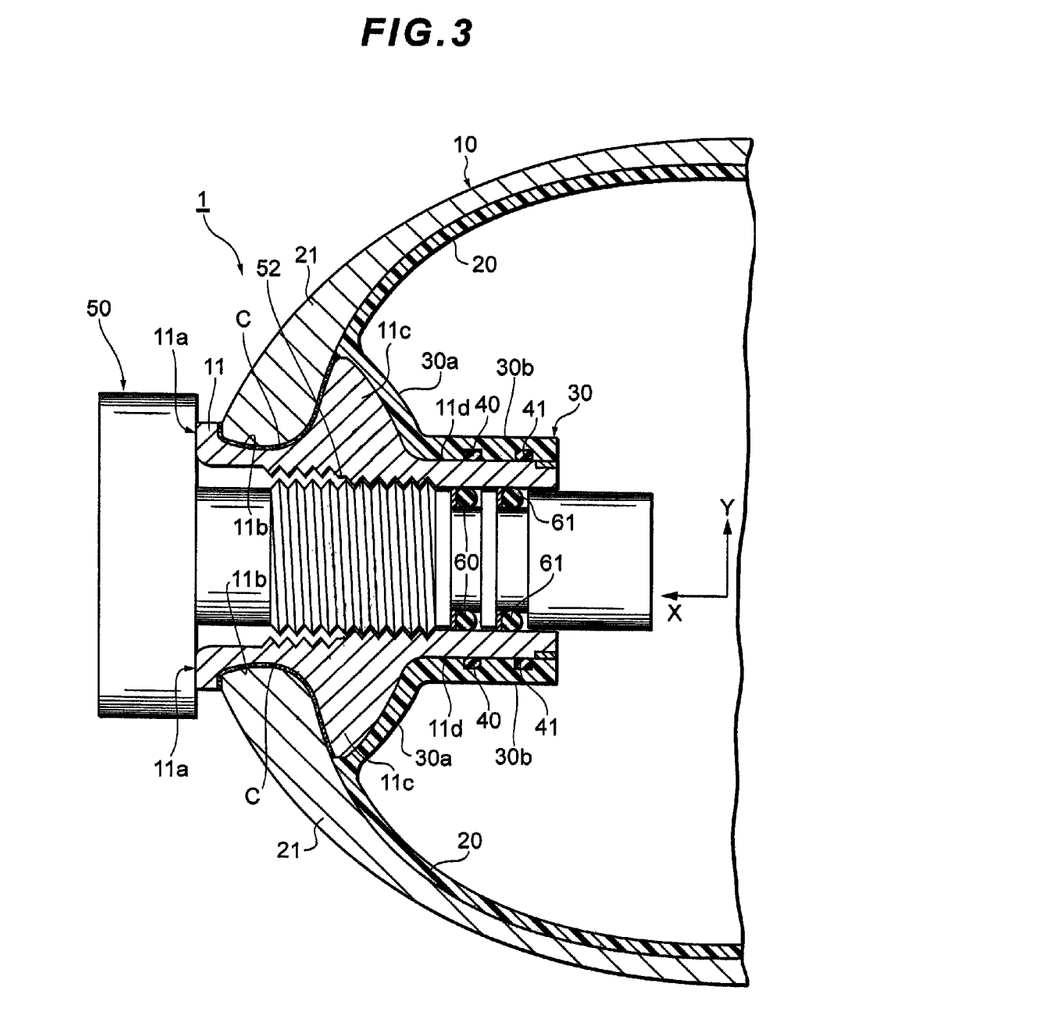
FIG. 3 is a sectional view showing a structure example around a mouthpiece of the tank.

FIG. 3 is a sectional view showing a main part of the tank 1. The tank 1 includes a cylindrical tank main body 10 having both ends, for example, with a schematically semispherical shape, and a mouthpiece 11 attached to an end of the tank main body 10 in a longitudinal direction. It is to be noted that in the present description, a substantially semispherical part is referred to as a dome part, a cylindrical trunk part is referred to as a straight part, and the parts are denoted with marks 1$d$ and 1$s$, respectively (see FIG. 1, FIG. 2, etc.). Moreover, the high-pressure tank 1 according to the present embodiment has the mouthpieces 11 at both ends, but for the convenience of the description, the tank is described with reference to FIG. 3 showing the main part of the high-pressure tank 1 in which a positive direction of an X-axis (a direction shown by an arrow) is a tip side and a negative direction thereof is a base side. A positive direction (a direction shown by an arrow) of a Y-axis which is vertical to the X-axis indicates a tank outer peripheral side.

The tank main body 10 includes a wall layer having, for example, a two-layers structure, and includes a liner 20 which is an inner wall layer and, for example, a Fiber Reinforced Plastic (FRP) layer 21 as a resin fiber layer (a reinforcing layer) which is an outer wall layer outside the liner. The Fiber Reinforced Plastic (FRP) layer 21 is formed by, for example, an only Carbon Fiber Reinforced Plastic (CFRP) layer 21$c$, or the Carbon Fiber Reinforced Plastic (CFRP) layer 21$c$ and a Glass Fiber Reinforced Plastic (GFRP) layer 21$g$ (see FIG. 1).

The liner 20 is formed into almost the same shape as the tank main body 10. The liner 20 is made of, for example, a polyethylene resin, a polypropylene resin, another hard resin or the like. Alternatively, the liner 20 may be a metal liner made of aluminum or the like.

On the tip side of the liner 20 provided with the mouthpiece 11, an inwardly bent folded part 30 is formed. The folded part 30 is folded back toward the inside of the tank main body 10 so that the folded part is disposed away from the outside Fiber Reinforced Plastic (FRP) layer 21. The folded part 30 has a tapered portion 30$a$ having a diameter which gradually decreases closer to a fold tip, and a cylindrical portion 30$b$ connected to the tip of the tapered portion 30$a$ and having a constant diameter. The cylindrical portion 30$b$ forms an opening of the liner 20.

The mouthpiece 11 has a schematically cylindrical shape, and is fitted into the opening of the liner 20. The mouthpiece 11 is made of, for example, aluminum or an aluminum alloy, and manufactured into a predetermined shape by, for example, a die cast process or the like. The mouthpiece 11 is fitted into a divided liner formed by injection. Moreover, the mouthpiece 11 may be attached to the liner 20 by, for example, insert forming.

Moreover, in the mouthpiece 11, for example, a valve fastening flange 11$a$ is formed on the tip side (outside the tank 1 in the axial direction), and an annular recess portion 11$b$ is formed behind the valve fastening flange 11$a$ (inside the tank 1 in the axial direction) with respect to the axis of the tank 1. The recess portion 11$b$ is curved to project on an axis side and has an R-shape. The recess portion 11$b$ comes in contact with the vicinity of the tip of the Fiber Reinforced Plastic (FRP) layer 21 having the same R-shape in an airtight manner.

For example, the surface of the recess portion 11$b$ which comes in contact with the Fiber Reinforced Plastic (FRP) layer 21 is provided with solid lubrication coating C such as a fluoric resin. This decreases a friction coefficient between the Fiber Reinforced Plastic (FRP) layer 21 and the recess portion 11$b$.

Further behind the recess portion 11$b$ of the mouthpiece 11, the mouthpiece is formed to conform to, for example, the shape of the folded part 30 of the liner 20, for example, a collar portion 11$c$ having a large diameter is formed continuously with the recess portion 11$b$, and a mouthpiece cylindrical portion 11$d$ having a predetermined diameter is formed behind the collar portion 11$c$. The tapered portion 30$a$ of the folded part 30 of the liner 20 comes in contact closely with the surface of the collar portion 11$c$, and the cylindrical portion 30$b$ comes in contact closely with the surface of the mouthpiece cylindrical portion 11$d$. Between the cylindrical portion 30$b$ and the mouthpiece cylindrical portion 11$d$, seal members 40 and 41 are interposed.

A valve assembly 50 controls supply/discharge of a fuel gas between an external gas supply line (a supply path 22) and the inside of the tank 1. Seal members 60 and 61 are interposed between the outer peripheral surface of the valve assembly 50 and the inner peripheral surface of the mouthpiece 11.

The Fiber Reinforced Plastic (FRP) layer 21 is formed, for example, by winding fibers (reinforcing fibers) 70 impregnated with a resin around the outer peripheral surface of the liner 20 and the recess portion 11$b$ of the mouthpiece 11 through filament winding forming (FW forming) and hardening the resin. As the resin of the Fiber Reinforced Plastic (FRP) layer 21, for example, an epoxy resin, a modified epoxy resin, an unsaturated polyester resin or the like is used. Moreover, as the fibers 70, carbon fibers (CF), metals fiber or the like are used. During the FW forming, while rotating the liner 20 around a tank axis (denoted with reference numeral 12 in FIG. 1 and FIG. 2), a guide of the fibers 70 is moved along the tank axial direction, whereby the fibers 70 can be wound around the outer peripheral surface of the liner 20. It is to be noted that in actual, a fiber bunch which is a bunch of a plurality of fibers 70 is usually wound around the liner 20, but in the present description, the fibers including the case of the fiber bunch are simply referred.

Next, there will be described a structure example which optimizes a laminating configuration of a hoop layer and a helical layer of the Fiber Reinforced Plastic (FRP) layer 21 to enhance an efficiency of strength development by the wound fibers 70 (see FIG. 2, etc.).

Here, an example of a filament winding (FW) device for winding the fibers 70 will simply be described. In an FW device 80 shown in FIG. 10 and FIG. 11, while rotating the liner 20 around the tank axis 12, a guide unit (referred to as "a dagger" or the like) 81 of the fibers 70 is reciprocated along the tank axial direction to wind the fibers 70 around the outer periphery of the liner 20. When a relative speed of movement of the guide unit 81 with respect to a rotation number of the liner 20 is changed, a winding angle of the fibers 70 can be changed. The guide unit 81 is supported operably by, for example, a jig.

As described above, the tank 1 is formed by winding the fibers (e.g. the carbon fibers) 70 around the outer periphery of the liner 20 and hardening the resin. Here, the winding of the fibers 70 includes hoop winding and helical winding (see FIG. 2), hoop layers (denoted with mark 70P in FIG. 4) are formed by hoop-wound layers of the resin, and helical layers (denoted with marks 70HH and 70HL in FIG. 4) are formed by helically wound layers, respectively. In the former hoop winding, the fibers 70 are wound around the straight part (the tank trunk part) 1s of the tank 1 in the form of a coil spring to tightly wind the corresponding part, and a force for countering a force directed in an Y-axis positive direction (a force to expand to the outside in a diametric direction) is exerted on the liner 20 by a gas pressure. On the other hand, the latter helical winding is a winding way for a main purpose of tightly winding the dome part 1d in a tight winding direction (inwardly in the tank axial direction), and the fibers 70 are wound around the whole tank 1 so that the fibers are caught by the dome part 1d, thereby mainly contributing to the enhancement of the strength of the dome part 1d. It is to be noted that an angle (an acute angle) formed by a helix (a screw thread line in a screw) of the fibers 70 wound in the form of the coil spring and the center line (the tank axis 12) of the tank 1 is "the winding angle with respect to the tank axis (12)" of the fibers 70 mentioned in the present description and denoted with mark a in FIG. 2 (see FIG. 2).

Among these various winding ways, in the hoop winding, the fibers 70 are wound around the straight part almost vertically to the tank axis 12, and in this case, a specific winding angle is, for example, from 80 to 90° (see FIG. 2). The helical winding (or impress winding) is a winding way of also winding the fibers 70 around the dome part, and the winding angle with respect to the tank axis 12 is smaller than in the hoop winding (see FIG. 2). The helical winding is roughly divided into two types of high-angle helical winding and low-angle helical winding, and in the high-angle helical winding, the winding angle with respect to the tank axis 12 is comparatively large, and a specific example of the winding angle is from 70 to 80°. On the other hand, in the low-angle helical winding, the winding angle with respect to the tank axis 12 is comparatively small, and a specific example of the winding angle is from 5 to 30°. Additionally, when the fibers 70 are parallel to the tank axis 12, the winding angle is 0°. The winding angle in a case where the fibers are wound in a peripheral direction is 90°. In the present embodiment, the helical winding including the helical winding with a winding angle of 0 to 5° is referred to as the low-angle helical winding.

It is to be noted that in the present description, helical winding with a winding angle of 30 to 70° which is an angle between the above angles is referred to as medium-angle helical winding sometimes. Furthermore, helical layers formed by the high-angle helical winding, the medium-angle helical winding and the low-angle helical winding are referred to as a high-angle helical layer (denoted with mark 70HH), a medium-angle helical layer (see FIG. 2) and a low-angle helical layer (denoted with mark 70LH), respectively. Moreover, a folded portion of the dome part 1d of the high-angle helical winding in the tank axial direction is referred to as a folded portion (see FIG. 2).

Usually in the hoop winding itself, the fibers 70 are spirally while the fibers are disposed adjacent to one another, and in the winding way, the fibers can be wound so that the fibers 70 are prevented from being superimposed on one another to prevent unevenness from being generated. On the other hand, the helical winding is usually performed for the main purpose of tightly winding the dome part, and in the winding way, it is difficult to decrease the superimposing of the fibers 70 and the unevenness, or the decreasing of these defects are not sufficiently taken into consideration. The hoop winding and the helical winding are appropriately combined in accordance with specifications such as an axial length, a diameter and the like of the tank 1, and the hoop layer 70P and a helical layer 70H are laminated around the liner 20 (see FIG. 1, etc.). At this time, when the helical layer 70H is disposed adjacent to the hoop layer 70P, the unevenness of the helical layer 70H is transferred to the hoop layer 70P, and bends (undulations) are generated in the fibers 70 of the hoop layer 70P sometimes. In particular, when the bends (the undulations) are generated in the axial fibers (e.g. the hoop layers 70P) laminated on and under the high-angle helical layer 70HH to cause meanderings, this can be a factor to deteriorate a strength development efficiency by the fibers 70.

Figure 4:
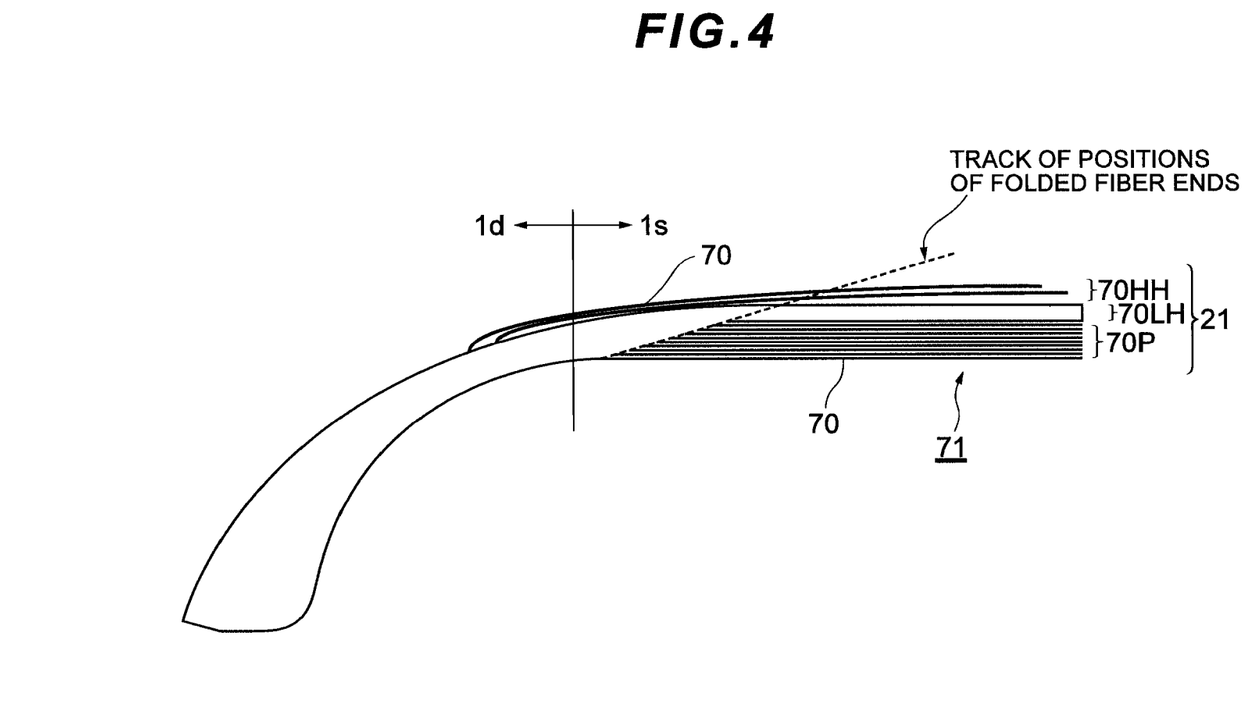
FIG. 4 is a diagram showing an only partial section of the tank and showing an example of a laminating configuration of an axial fiber layer and a peripheral fiber layer in the vicinity of a boundary between a dome part and a straight part.
Figure 5:
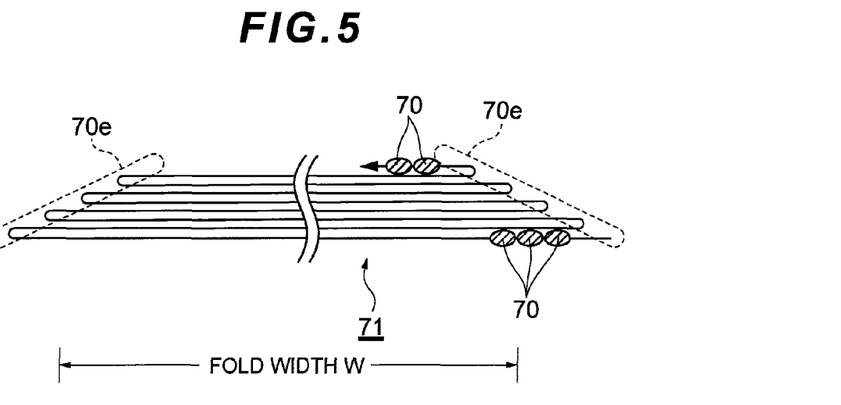
FIG. 5 is a diagram showing a configuration of the fiber winding and showing an example of a track drawn by folded fiber ends of peripheral fibers.

In this respect, according to the present embodiment, in the tank 1 having the Fiber Reinforced Plastic (FRP) layer 21 constituted of the axial fibers and the peripheral fibers, folded fiber ends 70e of the peripheral fibers in the tank axial direction of the layer draw a track which narrows from the inside toward the outside of the fiber layers in the laminating direction (see FIG. 4 and FIG. 5). The "track" can be defined as a group of all points that satisfy predetermined conditions. The track of the folded fiber ends 70e mentioned in the present description is the group of the folded fiber ends 70e seen in a vertical section of the tank 1. Moreover, an axial fiber layer is a fiber layer formed by winding the fibers 70 around the outer periphery of the liner 20 at a winding angle in a range exceeding 0° and less than 30° with respect to the tank axis 12 in the center of the tank, and a peripheral fiber layer is a fiber layer formed by winding the fibers around the outer periphery of the liner 20 at a winding angle in a range of 30° or more and less than 90° with respect to the tank axis 12 (see FIG. 2). Among the above various fiber layers, the hoop layer (a winding angle from 80 to 90°) 70P, the high-angle helical layer (a winding angle from 70 to 80°) 70HH and the medium-angle helical layer (a winding angle from 30 to 70°) are the peripheral fiber layers. Moreover, the low-angle helical layer (a winding angle from 0 to 30° and preferably from 5 to)30°) 70LH is the axial fiber layer, and is formed by fibers which come in contact with, for example, the mouthpiece 11 and are laminated in the vicinity of the mouthpiece 11. It is to be noted that in FIG. 2 and the like, the peripheral fibers and the layers (the peripheral fiber layers) formed by the fibers are denoted with reference numeral 71, and the axial fibers and the layers (the axial fiber layers) formed by these fibers are denoted with reference numeral 72.

Figure 6:
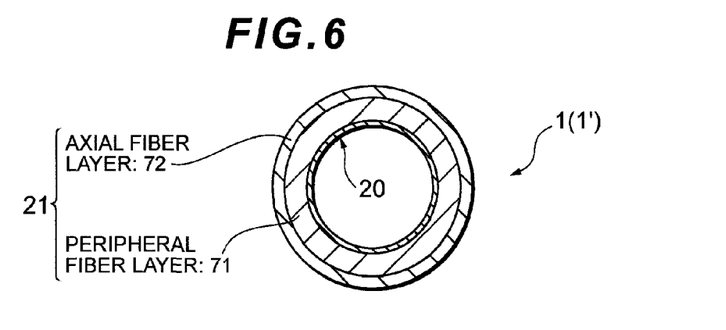
FIG. 6 is a sectional view cut along the A-A line of FIG. 1 and showing an example of the laminating configuration of the axial fiber layer and the peripheral fiber layer.
Figure 7:
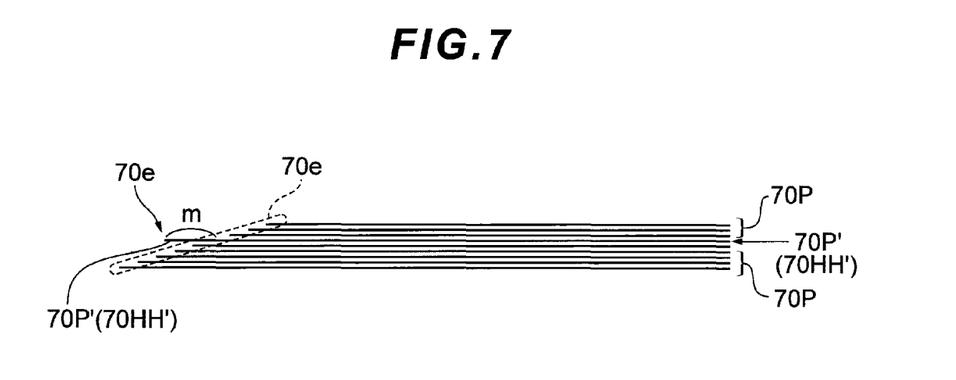
FIG. 7 is a diagram schematically showing an example of a configuration in which the folded fiber ends of part of the peripheral fiber layer are positioned closer to the center of the tank in a tank axial direction than the folded fiber ends of another peripheral fiber layer.
Figure 8:
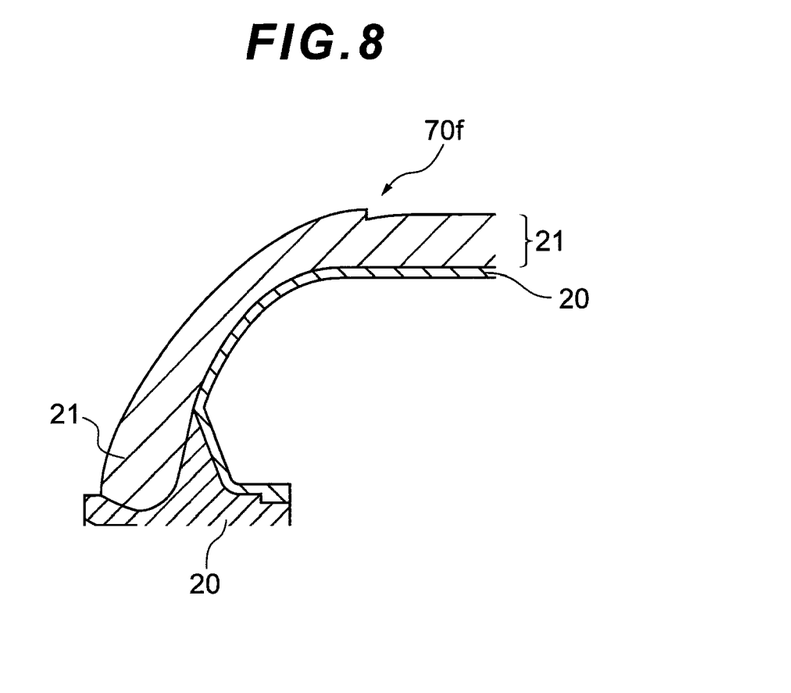
FIG. 8 is a partially sectional view of the tank showing a configuration in a case where a high-angle helical layer forms a thick reinforcing frame.
Figure 9:
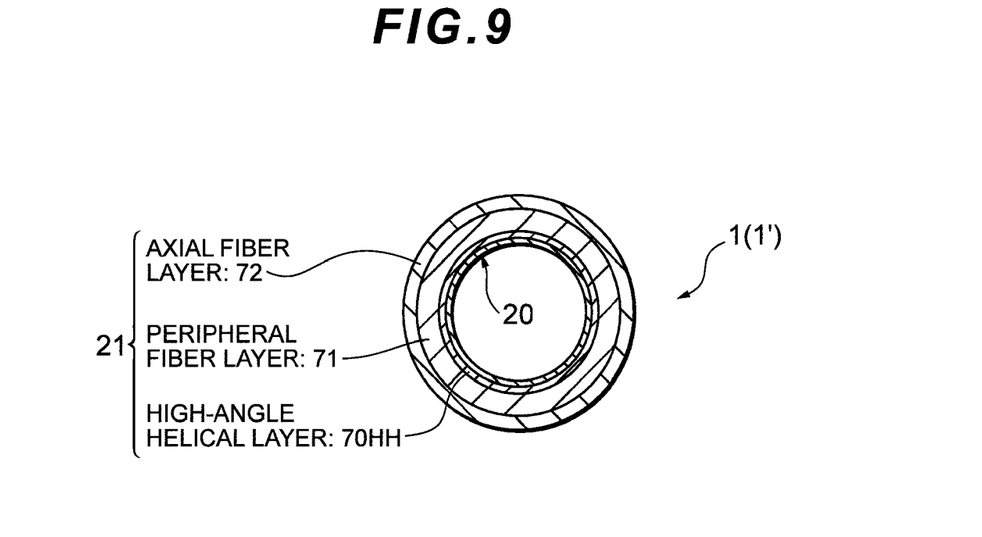
FIG. 9 is a sectional view cut along the A-A line of FIG. 1 and showing another embodiment of the present invention.
Figure 10:
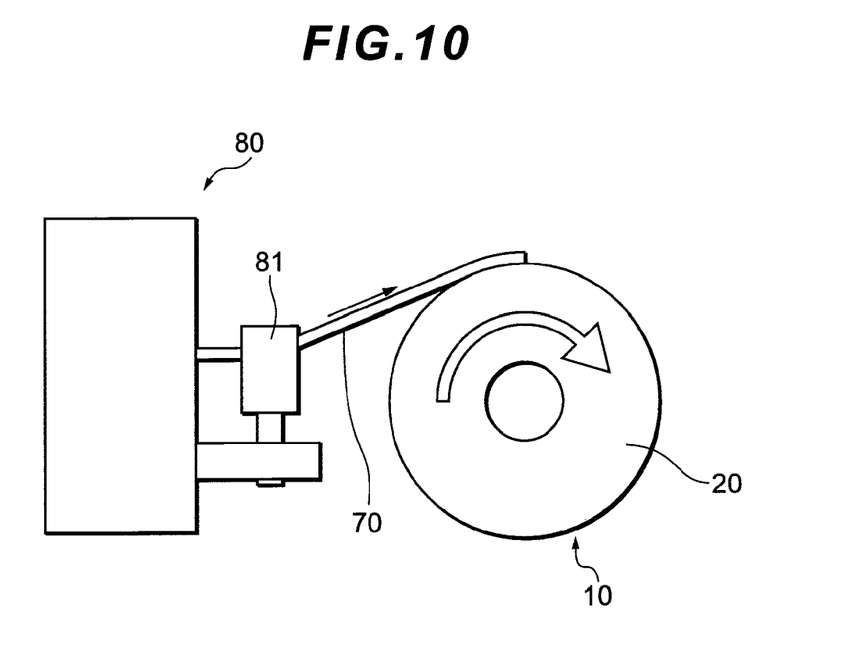
FIG. 10 is a diagram showing an example of a filament winding (FW) device.
Figure 11:
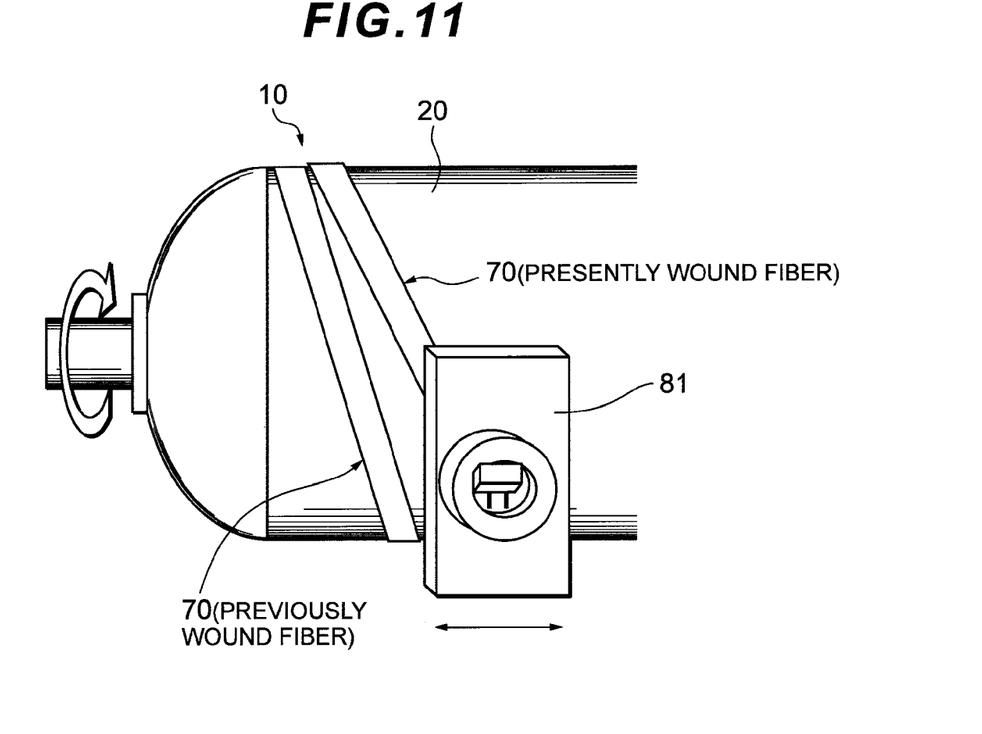
FIG. 11 is a diagram showing a behavior of winding the fibers around the outer periphery of a liner by use of a fiber guide unit of the FW device.

In the case of such a laminate structure, an occupying ratio of the peripheral fiber layer 71 is preferably larger in an inward portion (an inner layer) than in an outward portion (an outer layer) in a laminating direction of the respective fiber layers (see FIG. 4 and FIG. 6). Usually, both the helical layer 70H and the hoop layer 70P have a larger degree of contribution to a tank strength in the layers positioned inside (the layers closer to the liner 20). In particular, the hoop layer 70P of the innermost layer has a large function in the straight part 1s is tightly wound and the fiber strength is sufficiently developed and exerted. In this respect, according to the present embodiment, the hoop layers 70P of the peripheral fiber layer 71 are integrally formed in an inner layer portion (the formation of the inner layer), and the hoop layer 70P integrally formed on the inner layer side improves the development efficiency of the fiber strength. Additionally, the low-angle helical layer 70LH (the axial fiber layer 72) is formed in the periphery of the hoop layer, and the high-angle helical layer 70HH constituting the outermost layer of the Fiber Reinforced Plastic (FRP) layer 21 is further formed further in the periphery of the low-angle helical layer (see FIG. 4 and FIG. 6). Additionally, in this case, the high-angle helical layer 70HH can be constituted of a single layer, but is constituted of a plurality of layers in the present embodiment. In consequence, more peripheral fiber layers 71 (especially hoop layers 70P) are arranged in the inner layer portion closer to the tank, and the development ratio of the fiber strength by the peripheral fiber layer 71 (especially the hoop layer 70P) can be maintained in a high state.

Figure 12:
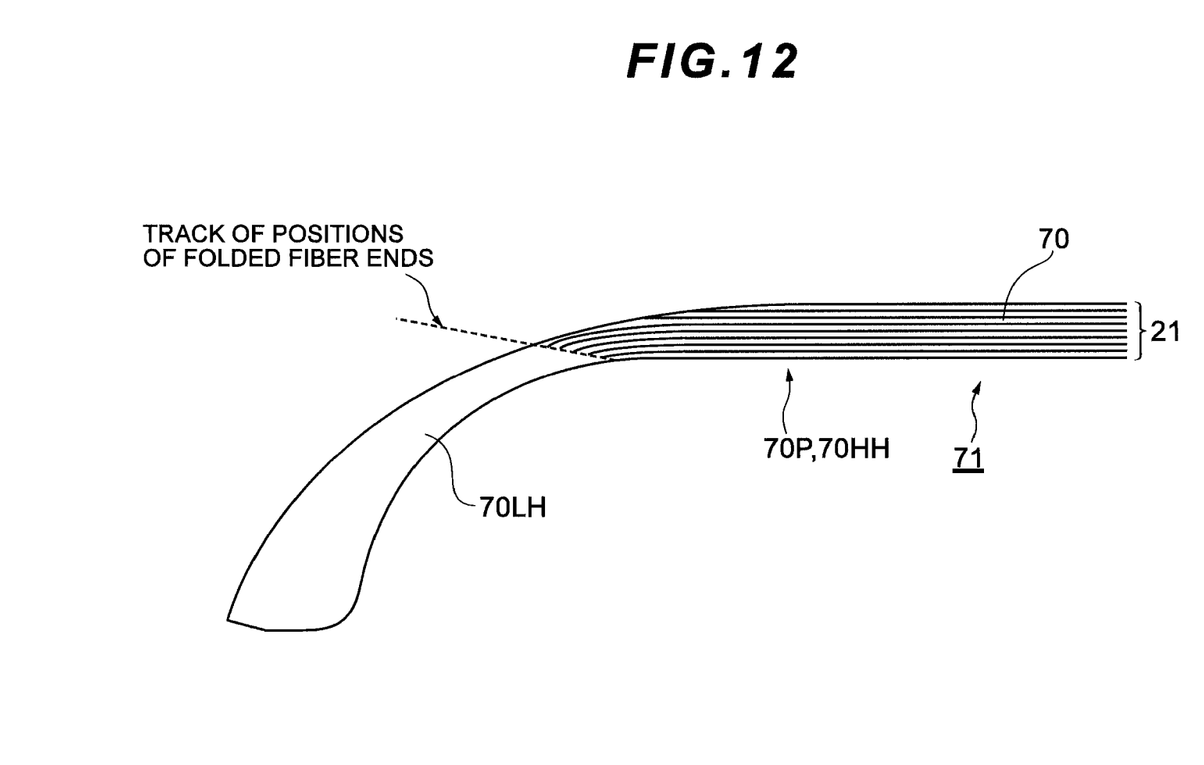
FIG. 12 is a diagram showing an only partial section of the tank and showing, as a reference, an example of a laminating configuration of an axial fiber layer and a peripheral fiber layer in a conventional tank.

That is, as in a conventional example, when the peripheral fiber layer 71 (the hoop layer 70P, the high-angle helical layer 70HH and the medium-angle helical layer) and the axial fiber layer 72 (the low-angle helical layer 70LH) are uniformly laminated in the Fiber Reinforced Plastic (FRP) layer 21 (laminated so that the thicknesses of the respective layers are uniformly repeated), it has been difficult to develop a high fiber strength by the hoop layer 70P (see FIG. 12). In this respect, in the present embodiment in which more hoop layers 70P are arranged in the inner layer portion to form the so-called inner layer as described above, especially the high fiber strength by the hoop layer 70P can easily be developed. It is to be noted that the formation of the inner layer of the peripheral fiber layer 71 (especially the hoop layer 70P) can be realized, for example, by integrally forming the hoop layers 70P in 75% of an inner layer side of the thickness of the Fiber Reinforced Plastic (FRP) layer 21 (a portion of the Fiber Reinforced Plastic (FRP) layer 21 which is close to the origin of the Y-axis) (see FIG. 4, FIG. 6, etc.).

Additionally, as described above, in the present embodiment, the folded fiber ends 70e of the peripheral fiber layer 71 (especially the hoop layer 70P) in the tank axial direction draw a track which gradually narrows closer to the center in the tank axial direction from the inside (the inner layer) to the outside (the outer layer) in the laminating direction of the fiber layers. That is, when the fibers which form the peripheral fiber layer 71 (especially the hoop layer 70P) are wound, a length (a fold width w) from the folded fiber end 70e and the next folded fiber end 70e is gradually narrowed, and the tracks of the folded fiber end 70e in a section form both right and let sides of a trapezoidal shape (see FIG. 5). Therefore, as the laminating of the peripheral fiber layer 71 (the hoop layer 70P in the present embodiment) is repeated, the fold width narrows, and the folded fiber end 70e come closer to the center of the tank. In a conventional configuration, the high-angle helical layer has a certain degree of thickness, and the bends (the undulations) are generated in the low-angle helical layer projecting from the high-angle helical layer sometimes (see FIG. 12). In the present embodiment in which the folded fiber ends 70e are tilted close to the center in the tank axial direction as described above, it is possible to suppress the bends (the undulations) of, for example, the low-angle helical layer 70LH formed on the high-angle helical layer.

This will further be described. In the conventional configuration, when the bends (the undulations) are generated in the low-angle helical layer 70LH which projects from the high-angle helical layer 70HH, it has been difficult sometimes to smoothly and continuously form the high-angle helical layer 70HH and the low-angle helical layer 70LH especially in the vicinity of a joint portion (a connecting portion) between the straight part 1s and the dome part 1d of the tank 1. In this respect, in the tank 1 of the present embodiment, it is possible to integrally form the low-angle helical layers 70LH especially into a smooth shape in the vicinity of the joint portion which becomes the boundary between the straight part 1s and the dome part 1d (see FIG. 4).

Additionally, in the tank 1, another helical layer (e.g. the low-angle helical layer 70LH shown in FIG. 4) can efficiently be laminated on a tilt portion. That is, when the folded fiber ends 70e of the hoop layers 70P gradually come closer to the mouthpiece 11 of the tank 1, the bends (the undulations) or meanderings are generated in the layer (the low-angle helical layer 70LH or the like) formed between the hoop layers 70P. In consequence, the fiber strength is not sufficiently developed sometimes (see FIG. 12). In the present embodiment, however, when the fibers 70 are efficiently laminated so that any bend or the like is not generated in the corresponding layer (the low-angle helical layer 70LH in the present embodiment), the development ratio of the fiber strength can be enhanced.

Moreover, the high-angle helical layer 70HH is preferably used in the outermost layer of the Fiber Reinforced Plastic (FRP) layer 21. Usually in the high-angle helical layer 70HH, the folded fiber end 70e of the fibers 70 are positioned in a boundary portion between the straight part 1s and the dome part 1d of the tank 1, whereby the corresponding portion easily becomes thick. When the high-angle helical layer 70HH is used in an intermediate layer of the Fiber Reinforced Plastic (FRP) layer 21, as in the conventional example, the fiber bends (the undulations) or the meanderings are generated in the low-angle helical layer 70LH sometimes owing to the thickened folded fiber ends 70e. In this respect, according to the present embodiment, the high-angle helical layer 70HH is formed in the outermost layer, and the fiber bends or the like in the low-angle helical layer 70LH are suppressed, wherein the high fiber strength can be developed as a whole (see FIG. 4). It is to be noted that FIG. 4 shows only some of the fibers 70 constituting the high-angle helical layer 70HH, and do not show all the fibers 70.

It is to be noted that there is not any special restriction on a specific content in a case where the occupying ratio of the peripheral fiber layer 71 is increased as described above, but the hoop layers 70P or the helical layers 70H having a so-called hoop rich state with a layer number ratio, i.e., a value of (the number of the hoop layers 70P):(the number of the helical layers 70H) which is 2 or more preferably constitute the Fiber Reinforced Plastic (FRP) layer 21. When the layer number of the hoop layers 70P is twice or more as much as the layer number of the helical layers 70H, a necessary strength is preferably easily guaranteed especially in the straight part 1s of the tank 1.

Moreover, in the above embodiment, two or more fiber layers of the same type are preferably laminated as a group to constitute the peripheral fiber layer 71. For example, when the fibers are wound at a winding angle of 89° to form the hoop layer 70P, two or more hoop layers 70P are laminated at a winding angle of 89° as a group constituted of the same type of layers, whereby, for example, the unevenness of the helical layer 70H is prevented from being transferred to the hoop layer 70H, and the fatigue strength of the fibers 70 can be enhanced. Further in consequence, while suppressing labors and time required for winding the fibers 70, the development efficiency of the fiber strength can be enhanced.

Furthermore, there has been described so far a case where the folded fiber ends 70e of the peripheral fiber layer 71 (e.g. the hoop layers 70P) draw the track which narrows from the inside toward the outside in the laminating direction (see FIG. 4), but in this case, the track does not have to constantly narrow from the inside (the inner layer) to the outside (the outer layer) in the laminating direction. For example, the folded fiber ends 70e of part of the peripheral fiber layer 71 may be positioned closer to the center of the tank in the tank axial direction than the folded fiber ends 70e of the other peripheral fiber layer 71 positioned outwardly (the outer layer) from the peripheral fiber layer 71 in the laminating direction. A specific example will be described. When the hoop layers 70P are laminated at a winding angle of 89° to form the group of the peripheral fibers, one layer of the fiber group is, for example, a hoop layer 70P' having a winding angle of 80° (or may be a high-angle helical layer 70HH' having a winding angle which is less than 80°), and the folded fiber end 70e of the hoop layer 70P' may extend as much as, for example, m from the folded fiber end 70e of the hoop layer 70P on the inner side from the above end in the tank axial direction (see FIG. 7). When the formability, smoothness and the like of the hoop layer or the high-angle helical layer 70HH constituting each layer of the peripheral fiber layer 71 are taken into consideration, as to the positions of the folded fiber end 70e of these peripheral fiber layers 71, the folded ends thereof do not have to be arranged so that the track of the ends narrows toward the outer periphery of the tank. Even if the positions of the folded fiber ends 70e shift forwards or backwards in part of the peripheral fiber layer 71 in this manner, the folded fiber ends 70e may draw a track which entirely narrows from the inner layer to the outer layer.

In the tank 1 of the present embodiment described above, a function and an effect are obtained as described hereinafter.

That is, in the present embodiment, for example, the folded fiber ends 70e narrow from the inner layer toward the outer layer, whereby the laminating configuration of the hoop layer 70P and the helical layer 70H is optimized. In consequence, the efficiency of the strength development by the fibers 70 wound around the liner 20 can be enhanced. This is especially effective in the present situation where the enlargement and high pressure of the tank 1, the decrease of the number of the tanks and the like are demanded.

Moreover, the Fiber Reinforced Plastic (FRP) layer 21 of the tank 1 is usually constituted of the hoop layer 70P and the high-angle helical layer 70HH which mainly share a stress in a tank peripheral direction, or constituted of the low-angle helical layer 70LH and the like which mainly share a stress in the tank axial direction, but further in the present embodiment, the occupying ratio of the peripheral fiber layer 71 is made larger in the inward portion (the inner layer) than in the tank outward portion (the outer layer). Consequently, especially in the peripheral fiber layer 71 (the hoop layer 70P in the present embodiment), a higher fiber strength can be developed.

Furthermore, in the tank 1 of the present embodiment, when the folded fiber ends 70e of the peripheral fiber layer 71 (especially the hoop layers 70P) are disposed in the straight part 1s or in the vicinity thereof, the high-angle helical layer 70HH is disposed closer to the side of the straight part 1s (closer to the center of the tank), the fiber strength is further developed, and a so-called hoop can be formed. Needless to say, in this case, the fiber strength per layer of the high-angle helical layer 70HH can be enhanced, and the thickness of the high-angle helical layer 70HH can be decrease as much as the strength. Similarly, the low-angle helical layer 70LH can be disposed closer to the side of the straight part 1s (closer to the center of the tank). Therefore, in the structure, the fiber strength per layer of the low-angle helical layer 70LH is enhanced, and the thickness of the low-angle helical layer 70LH can be decreased as much as the strength.

Moreover, the low-angle helical layers 70LH are smoothly and integrally formed in the vicinity of the joint portion between the straight part 1s and the dome part 1d (see FIG. 4). It is to be noted that according to the tank 1 of the present embodiment in which the high-angle helical layer 70HH is used in the outermost layer of the Fiber Reinforced Plastic (FRP) layer 21, it is possible to prevent the high-angle helical layer 70HH from being formed into a hoop and prevent the generation of the bends (the undulations) and the meanderings in the fibers 70 of the low-angle helical layer 70LH. For example, in the present embodiment, both ends of the peripheral fiber layer 71 (especially the hoop layer 70P) in the tank axial direction (both annular ends of the cylindrically formed peripheral fiber layer 71) are tapered so as to narrow along the tank axial direction (see FIG. 4 or the like). Moreover, both ends of the low-angle helical layer 70LH are continuously formed on an annular slope of the peripheral fiber layer 71 having such a tapered shape, to form the low-angle helical layer 70LH. In consequence, while avoiding a conventional state where the folded fiber ends 70e of the hoop layers 70P gradually come closer to the mouthpiece 11 of the tank 1 and preventing the generation of the bends in the low-angle helical layer 70LH, the low-angle helical layer 70LH can be formed so as to smoothly and continuously obtain the development efficiency of the fiber strength.

Additionally, in the folded fiber ends 70e, characteristics that the ends easily thicken owing to the superimposing of the fibers 70 on one another are utilized, whereby the high-angle helical layer 70HH can form a reinforcing frame. That is, when the thickness of the Fiber Reinforced Plastic (FRP) layer 21 increases and hence the influence of the stress gradient cannot be ignored, for example, the high-angle helical layers 70HH are integrally formed in the outer layer, and the folded fiber ends 70e are thickened. In consequence, the high-angle helical layers can have a function of a reinforcing frame 70f which can decrease such an influence of the stress gradient (see FIG. 8). In preparation for impact when the tank drops down, when a vehicle collides or the like, the tank 1 is requested to have a predetermined shock resisting performance. Therefore, when the folded fiber ends 70e are thickened in this manner, especially a portion which easily interferes with the outside (e.g. the joint portion between the straight part 1s and the dome part 1d or a portion from this joint portion to the dome part 1d) can be reinforced. Moreover, the straight part 1s and the dome part 1d of the tank 1 have different thicknesses and rigidities, and hence the parts have different stresses. The stress in the straight part is usually higher, and the parts are integrally formed via the joint portion, so that a moment is also exerted on the joint portion. The reinforcing frame 70f formed as described above is further preferably thickened so as to cancel such a moment.

Moreover, as described above, the present embodiment optimizes the laminating configuration of the hoop layer 70P and the helical layer 70H, and the fiber strength is efficiently developed in the respective directions (the tank axial direction, the laminating direction (a tank diametric direction) and the peripheral direction) and various fiber layers. In consequence, it is possible to decrease the thickness of each layer, the amount of the fibers and further the total number of the layers. Therefore, the weight saving of the whole tank 1 can advantageously be realized.

Furthermore, when the total number of the layers (the hoop layer 70P and the helical layer 70H) constituting the Fiber Reinforced Plastic (FRP) layer 21 is decreased as described above, the content amount of the tank 1 can be increased. When the tank 1 is utilized as, for example, a tank for supplying hydrogen to a fuel cell car, the tank can contribute to the lengthening of a cruising distance of the car.

Additionally, when the folded fiber ends 70e are arranged closer to the center in the tank axial direction as in the embodiment described above, the weight saving of the tank 1 can advantageously be achieved. Above all, in the tank (the tank in which a tank diameter is large for a length in an axial direction) 1 having a shape with a small L/D (a tank axial length/a tank diameter), an effect of the weight saving is large. That is, in the tank (the tank which is thick for the axial length) 1 having the shape with the small L/D, as compared with a tank (the tank which is thin for the axial length) 1 having the shape with a large L/D, the thickness of the Fiber Reinforced Plastic (FRP) layer 21 as a resin fiber layer (a reinforcing layer) increases, and the efficiency of the strength development of the fibers 70 easily lowers. In consequence, the resin fiber layer (the reinforcing layer) more easily thickens, but according to the present embodiment, especially the effective weight saving of the tank 1 can be achieved.

Moreover, when the development efficiency of the fiber strength is enhanced as in the embodiment described above, a breadth of the employable fibers 70 broadens, and fibers 70 having lower strength or rigidity than before can be employed. According to this example, cost saving required for the tank 1 can be achieved.

Furthermore, in the tank 1 described above, more peripheral fiber layers 71 (e.g. the hoop layers 70P) are arranged inwardly in the tank to form the inner layer or the like, and hence the layers of the fibers 70 of the same type are continuously or integrally wound. In this case, it is possible to decrease combination winding required when shifting to different types of fiber layers 70 (e.g. shifting from the hoop layer 70P to the low-angle helical layer 70LP), so that stepped portions of the fibers 70 can be minimized. It is possible to achieve the weight saving of the tank 1, the shortening of forming time and the enhancement of quality and performance.

It is to be noted that the above embodiment is an example of the preferable mode for carrying out the present invention, but the present invention is not limited to this example, and can variously be modified without departing from the scope of the present invention. For example, in the above embodiment, it has been described above that the effect of the weight saving in the tank 1 having a shape with a small L/D (the tank axial length/the tank diameter) is large, but a constitution in which the axial fiber layer 72 and the peripheral fiber layer 71 are wound around the liner 20 is one of basic elements of a pressure container made of Fiber Reinforced Plastic (FRP), and the present invention can be applied to various types of the tank 1 including the Fiber Reinforced Plastic (FRP) layer 21 regardless of the L/D, a size of a use pressure, the shape or the thickness of the Fiber Reinforced Plastic (FRP) layer 21 or the like. An example will be described. As apparent from the following equation 1, a minimum necessary thickness t of the straight part 1s of the tank 1 is proportional to a product of a use pressure P and a tank radius R (it is to be noted that $\sigma_1$ indicates a tensile strength (a breakdown stress or a fiber breakdown stress)). The present invention can be applied to the tank 1 having any shape in accordance with the necessary total number of the layers in the fiber layers calculated on the basis of this equation.

$$t=3PR/2\sigma_1 \quad \text{[Equation 1]}$$

Moreover, in the above embodiment, there has been described illustration of a case where the present invention is applied to a hydrogen tank which can be utilized in a fuel cell system or the like, but needless to say, the present invention can be applied to a tank to be filled with a fluid other than a hydrogen gas, for example, a high-pressure pressure container to be utilized in a compressed natural gas (CNG) vehicle in which the CNG is used as a fuel or the like.

Furthermore, the present invention can be applied to a member other than the tank (the pressure container), for example, a cylindrical member (including a cylindrical portion) 1' such as a long member or structure including the Fiber Reinforced Plastic (FRP) layer. An example will be described. When the Fiber Reinforced Plastic (FRP) layer 21 including the helical layers 70H or the hoop layers 70P is formed by winding the fibers 70 around the outer side of an axle (e.g. a mandrel or the like) or a mold through helical winding or hoop winding, the hoop layers 70P are integrally arranged inwardly to form the inner layer or the layers are arranged so that the folded fiber ends 70e draw a track which narrows toward the outer layer, to enhance the development efficiency of the fiber strength. In this manner, a function and an effect can be realized in the same manner as in the above embodiment. Specific examples of the cylindrical member 1' in a case where the present invention is applied to the cylindrical member in this manner include a sporting equipment such as a shaft of a golf club or a carbon bat, leisure goods such as a fishing rod, an engineering product such as a plant facility and a structure such as a construction material.

Moreover, although not described in detail in the above embodiment, at least part of the helical layer 70H is formed as a flat and smooth helical layer, and unevenness to be generated in the hoop layer 70P outwardly disposed adjacent to the helical layer is preferably decreased. The flat and smooth helical layer 70H mentioned herein is a layer formed through the helical winding so as to decrease the superimposing of the fibers 70 on one another in the layer. In principle, the next fiber 70 is wound to be disposed right beside the adjacent fiber 70, and the superimposing of the fibers 70 is different from that in a conventional helical layer (an uneven helical layer). Thus, part of the helical layer 70H is formed as the flat and smooth helical layer. Additionally, when the fibers 70 are hoop-wound around the outer side of the flat and smooth helical layer 70H to form the hoop layer 70P, it is possible to decrease the structural bends (the undulations), waving or swell. That is, the surface (the surface layer) of the flat and smooth helical layer 70H has a flatter and smoother surface than before, and hence in the hoop layer 70P formed on the flat and smooth surface, the structural bends (the undulations) of the fibers 70 due to the unevenness decrease. When the structural bends (the undulations) of the fibers 70 of the hoop layer 70P are suppressed in this manner, the fatigue strength of the fibers 70 can be enhanced, and it is possible to obtain advantages that the hoop layer 70P becomes thin and has a higher Vf to enhance a burst strength. Moreover, since the helical layer 70H itself is flat and smooth, the burst strength can be enhanced through the thin layer and the high Vf. Vf indicates a fiber volume content ratio. When the value (Vf value) increases, the content ratio of the fibers becomes high, and the content ratio of the resin becomes small. If the value of Vf is excessively high, fatigue durability deteriorates. If the value is excessively lowered, the outer shape of the tank becomes large.

Moreover, in the tank 1 described above, the winding around the liner 20 can start with the fibers 70 which form the helical layer 70H or the fibers 70 which form the hoop layer 70P. When the fibers 70 with which the winding starts are appropriately changed in this manner, it is possible to set the breakdown start position if the tank 1 breaks down. As described above, in both the helical layers 70H and the hoop layers 70P, the layer positioned on the inner side (the layer closer to the liner 20) has a larger degree of contribution to the tank strength. Therefore, for example, when the winding around the liner 20 starts with the fibers 70 which form the hoop layer 70P and the fiber strength for the straight part $1s$ is set to be larger than that for the dome part $1d$, the dome part $1d$ can beforehand be set as the breakdown start position.

Furthermore, in the above embodiment, there has been described a case where the peripheral fiber layer 71 is disposed on the inner layer side of the Fiber Reinforced Plastic (FRP) layer 21 and the axial fiber layer 72 is disposed on the outer layer side thereof, with reference to FIG. 5, but this case is merely an example, and another configuration can appropriately be used. For example, when a sufficient fiber strength is developed by the axial fibers 72 (the low-angle helical layer 70LH), the high-angle helical layer 70HH does not have to be disposed in the outermost layer (see FIG. 6).

In addition, when local deformation in the Fiber Reinforced Plastic (FRP) layer 20 is to be suppressed or when the deformation of the liner 20 is to be suppressed or the like, a single high-angle helical layer 70HH or a plurality of high-angle helical layers can be incorporated in a constitution. For example, in a configuration shown in FIG. 9, the high-angle helical layer 70HH constituted of a single layer (or a plurality of layers) is formed in the innermost layer (the outer periphery of the liner 20), to develop a desirable fiber strength.

INDUSTRIAL APPLICABILITY

The present invention is preferably applied to a tank having a Fiber Reinforced Plastic (FRP) layer, and further to a cylindrical member such as a long member or a structural member.

DESCRIPTION OF REFERENCE NUMERALS

1 . . . tank, 1' . . . cylindrical member, 12 . . . tank axis, 20 . . . liner, 21 . . . Fiber Reinforced Plastic (FRP) layer, 70 . . . fiber, 70$e$ . . . folded fiber end, 70P . . . hoop layer, 70LH . . . low-angle helical layer, 70HH . . . high-angle helical layer, 71 . . . peripheral fiber (layer), and 72 . . . axial fiber (layer).

The invention claimed is:
1. A tank comprising:
a liner; and
a fiber reinforced plastic layer including an axial fiber layer formed by winding fibers around the outer periphery of the liner at a winding angle in a range exceeding 0° and less than 30° with respect to a tank axis in the center of the tank, and a peripheral fiber layer formed by winding the fibers around the outer periphery of the liner at a winding angle in a range of 30° or more and less than 90° with respect to the tank axis,
wherein folded fiber ends of the peripheral fiber layer in an axial direction of the tank draw a track which narrows from the inside toward the outside in a laminating direction of the fiber layers including the axial fiber layer and the peripheral fiber layer,
wherein an occupying ratio of the peripheral fiber layer becomes larger in an inward portion than in an outward portion in the laminating direction of the fiber layers,
the tank further comprising a reinforcing frame which is formed so that folded fiber ends other than the folded fiber ends of the peripheral fiber layer are thickened,
the reinforcing frame is formed in a joint portion between a straight part and a dome part of the tank or in a portion between the joint portion and the dome part, and
a stepped portion, whose outer diameter becomes larger when approaching from the straight part to the dome part, is formed at the reinforcing frame.

2. The tank according to claim 1, wherein the folded fiber ends of the fiber layers formed outwardly in the laminating direction are positioned closer to the center of the tank than the folded fiber ends of the peripheral fiber layer in the tank axial direction formed inwardly in the laminating direction.

3. The tank according to claim 1, wherein the peripheral fiber layer is formed by laminating two or more fiber layers having the same degree of winding angle.

4. The tank according to claim 1, wherein the peripheral fiber layer is formed by a hoop layer having a winding angle of 80° or more and less than 90° with respect to the tank axis, and the axial fiber layer is formed by a low-angle helical layer having a winding angle of 0° or more and less than 30° with respect to the tank axis.

5. The tank according to claim 4, wherein a high-angle helical layer having a winding angle of 30° or more and less than 80° with respect to the tank axis is used in the outermost layer of the FRP layer.

6. The tank according to claim 4, wherein the FRP layer is constituted of the hoop layers and the helical layers at a ratio of the number of the hoop layers:the number of the helical layers which is 2 or more.

7. The tank according to claim 1, wherein the folded fiber ends of part of the peripheral fiber layer are positioned closer to the center of the tank in the tank axial direction than the folded fiber ends of another peripheral fiber layer positioned outwardly from the peripheral fiber layer in the laminating direction.

8. The tank according to claim 1, wherein the winding around the liner starts with the fibers which form the helical layer at a winding angle of 0° or more and less than 80° with respect to the tank axis.

9. The tank according to claim 1, wherein the winding around the liner starts with the fibers which form the hoop layer at a winding angle of 80° or more and less than 90° with respect to the tank axis.

10. A manufacturing method comprising the steps of winding fibers around the outer periphery of a liner at a winding angle in a range exceeding 0° and less than 30° with respect to a tank axis in the center of the tank to form an axial fiber layer; and winding the fibers at a winding angle in a range of 30° or more and less than 90° with respect to the tank axis to form a peripheral fiber layer, thereby forming an FRP layer,
wherein the peripheral fiber layer is formed so that folded fiber ends of the peripheral fiber layer in an axial direction of the tank draw a track which narrows from the inside toward the outside in a laminating direction of the fiber layers including the axial fiber layer and the peripheral fiber layer,
wherein an occupying ratio of the peripheral fiber layer becomes larger in an inward portion than in an outward portion in the laminating direction of the fiber layers,
further comprising providing a tank including a reinforcing frame which is formed so that folded fiber ends other than the folded fiber ends of the peripheral fiber layer are thickened,
the reinforcing frame is formed in a joint portion between a straight part and a dome part of the tank or in a portion between the joint portion and the dome part, and
a stepped portion, whose outer diameter becomes larger when approaching from the straight part to the dome part, is formed at the reinforcing frame.

* * * * *